United States Patent [19]

Lewis et al.

[11] Patent Number: 5,230,413
[45] Date of Patent: Jul. 27, 1993

[54] SEALING ARRANGEMENT FOR A CLUTCH WITH A LUBRICATED ADJUSTING RING

[75] Inventors: Shannon J. Lewis, Garrett; Keith M. Sinram, Ft. Wayne; William H. Sink, Auburn, all of Ind.

[73] Assignee: Dana Corporation, Toledo, Ohio

[21] Appl. No.: 906,327

[22] Filed: Jun. 30, 1992

[51] Int. Cl.⁵ .................. F16D 13/75; F16D 13/74
[52] U.S. Cl. .................. 192/70.25; 192/70.3; 192/111 B; 192/113 R
[58] Field of Search ............ 192/70.25, 70.3, 111 B, 192/111 R, 113 R; 277/165; 403/118

[56] References Cited

U.S. PATENT DOCUMENTS

| | | | |
|---|---|---|---|
| 2,280,355 | 4/1942 | Spase et al. ............ | 192/111 A |
| 3,001,619 | 9/1961 | Imperi .................. | 192/21.5 |
| 3,086,631 | 4/1963 | Imperi .................. | 192/21.5 |
| 3,156,323 | 11/1964 | Boyer .................. | 403/118 X |
| 3,994,604 | 11/1976 | Visser .................. | 403/118 X |
| 4,676,518 | 6/1987 | Kartchner et al. ....... | 280/276 |
| 4,711,474 | 12/1987 | Patrick ................. | 277/165 X |
| 4,760,906 | 8/1988 | Flotow et al. .......... | 192/70.25 |
| 4,898,393 | 2/1990 | Rollins ................ | 277/58 X |
| 5,086,898 | 2/1992 | Patton et al. ........... | 192/70.12 |

*Primary Examiner*—Rodney H. Bonck
*Attorney, Agent, or Firm*—Millen, White, Zelano & Branigan

[57] ABSTRACT

A sealing arrangement is provided between a clutch cover and adjusting ring wherein the clutch cover and adjusting ring are threadably engaged by an internal thread on the clutch cover and an external thread on the adjusting ring. The clutch cover has a smooth, cylindrical surface proximate the internal thread while the adjusting ring has a groove proximate the external thread with an "O" ring in the groove which is in sealing engagement with the smooth, cylindrical surface. The "O" ring retains a layer of grease between the threads substantially eliminating purging of the grease.

7 Claims, 3 Drawing Sheets

SEALING ARRANGEMENT FOR A CLUTCH WITH A LUBRICATED ADJUSTING RING

BACKGROUND OF THE INVENTION

This invention relates to sealing arrangements for adjusting rings utilized in clutches. More particularly, this invention relates to sealing arrangements for adjusting rings used in clutches to sustain lubrication of the adjusting ring.

BACKGROUND ART

In order to transmit drive from an engine-driven flywheel to an output shaft, many clutches utilize levers for selectively urging driving and driven discs into contact with one another. The levers have first ends pivoted on a release sleeve and second ends pivoted on a clutch cover which rotates with the flywheel. Intermediate the ends of each lever are abutment surfaces which urge a pressure plate against the discs to effect frictional coupling of the discs. As the discs wear, the clutch will begin to slip if the position of the levers is not adjusted to compensate for the wear.

The adjustment is accomplished by an adjusting ring having an external thread which is threadably coupled to an internal thread of the clutch cover. By rotating the adjusting ring so as to axially advance with respect to the clutch cover and the drive train, the second ends of the levers may be advanced so as to maintain proper pressure between the abutting surfaces of the levers and the pressure plate.

Typically, clutch components undergo considerable stress due to repeated impacts, vibration and exposure to contaminants and moisture. Accordingly, it is necessary to maintain lubrication between the exterior threads of the adjusting ring and interior threads of the clutch housing. Without lubrication, the mechanical and environmental stresses rapidly deteriorate the interface between the threads causing the adjustment ring to bind. Once the adjusting ring binds, then the only way to revive the clutch's performance is to replace the discs. Replacement of the discs is a labor-intensive, time-consuming undertaking generally requiring removing the clutch from the drive train, which frequently necessitates removing the transmission before removing the clutch. While over the life of a vehicle it is not unusual to replace a clutch a number of times, it is, of course, desirable to keep the number of replacements to a minimum. Minimizing disc replacements is what the adjusting ring accomplishes.

Unfortunately, it has been found that the grease originally placed in the threads coupling the adjusting ring to the clutch cover is frequently purged at relatively low hours which promotes fretting of the threads and allows contamination to degrade the threads, resulting in binding of the adjusting ring to the clutch cover. This makes it difficult to rotate the adjusting ring with respect to the clutch cover thereby frustrating the sometimes rather slight adjustments necessary to compensate for the abrasion of the frictional surfaces of the clutch plates. Not infrequently, the adjusting ring actually binds to the clutch cover after the grease is purged, which means that customers are faced with the expense of replacing the entire clutch assembly if the advantage of employing the adjusting ring is to be maintained. Since the same vehicle tends to be used for similar purposes, there is the distinct possibility that the adjusting ring in the replacement clutch might also bind at relatively low hours, as was the case with the original adjusting ring and clutch. This is a longstanding problem which, to the applicant's knowledge has yet to be addressed in the industry or in the published patent literature.

In view of the aforementioned considerations, there is a need for an arrangement for maintaining lubrication in the threaded area between the adjusting ring and the clutch cover for as long as possible, preferably over the life of the vehicle in which the clutch is utilized.

SUMMARY OF THE INVENTION

In view of the aforementioned considerations, it is an object of the instant invention to provide an arrangement for maintaining lubrication between the external thread of an adjusting ring and the internal thread of a clutch cover to which the adjustment ring is coupled, wherein the arrangement is accomplished with minimal expense and minimal structural reconfiguration of existing adjusting ring and cover structures.

In view of the aforementioned object and other objects, the instant invention contemplates a clutch with a seal for sealing lubricant between the external thread of the clutch cover. The seal comprises a groove in the adjusting ring with an elastically deformable "O" ring seated therein, the "O" ring sealingly engaging a cylindrical surface proximate the internal thread of the clutch cover. As the axial position of the adjusting ring with respect to the clutch cover is adjusted to compensate for frictional wear of discs in the clutch, the "O" ring maintains the seal with the cylindrical surface, thereby retaining lubricant between the threads, so that the adjusting ring is readily rotatable for the next adjustment.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

1. The Clutch and Its Operation

Figure 1:
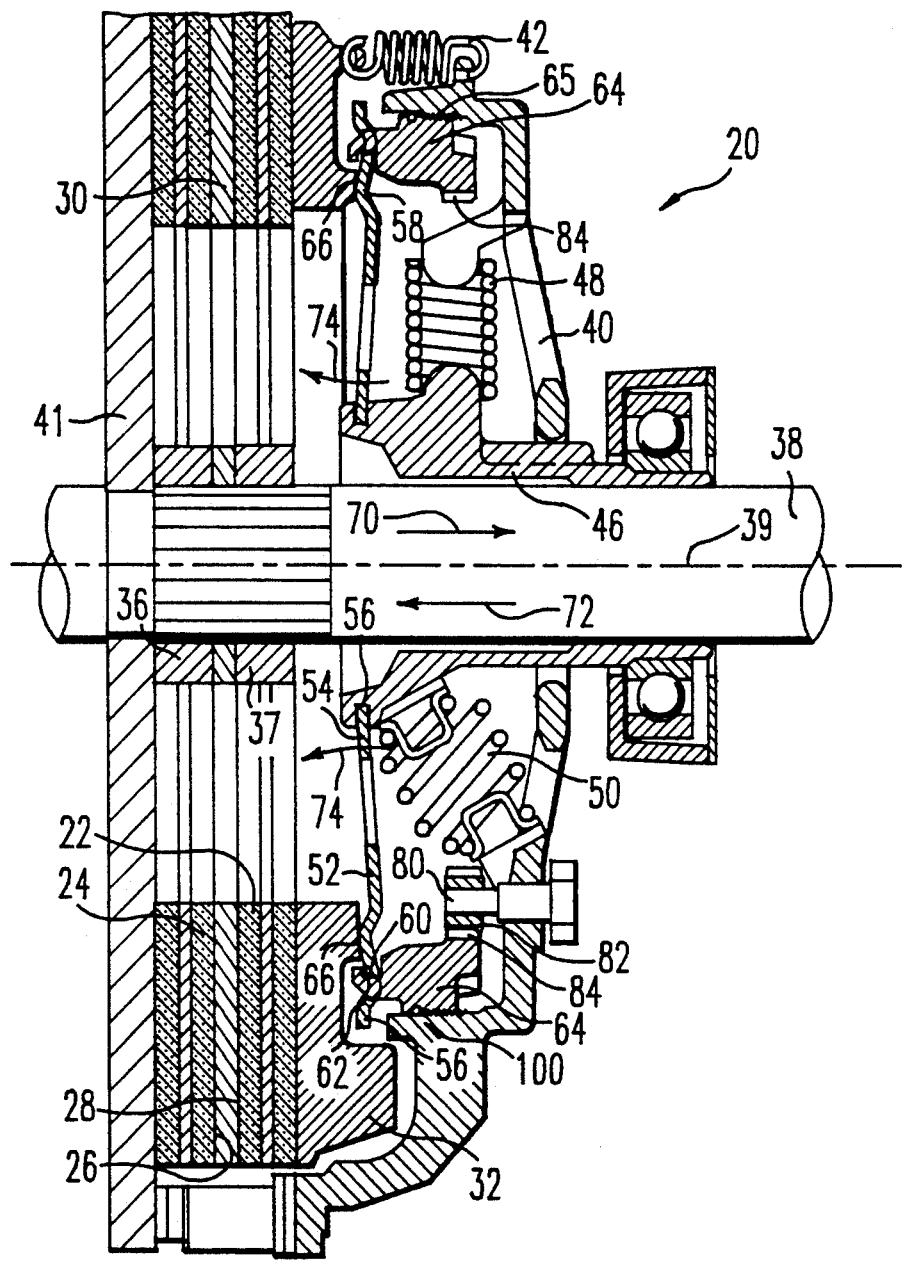
FIG. 1 is a side elevational view of a clutch employing the sealing arrangement of the instant invention.
Figure 2:
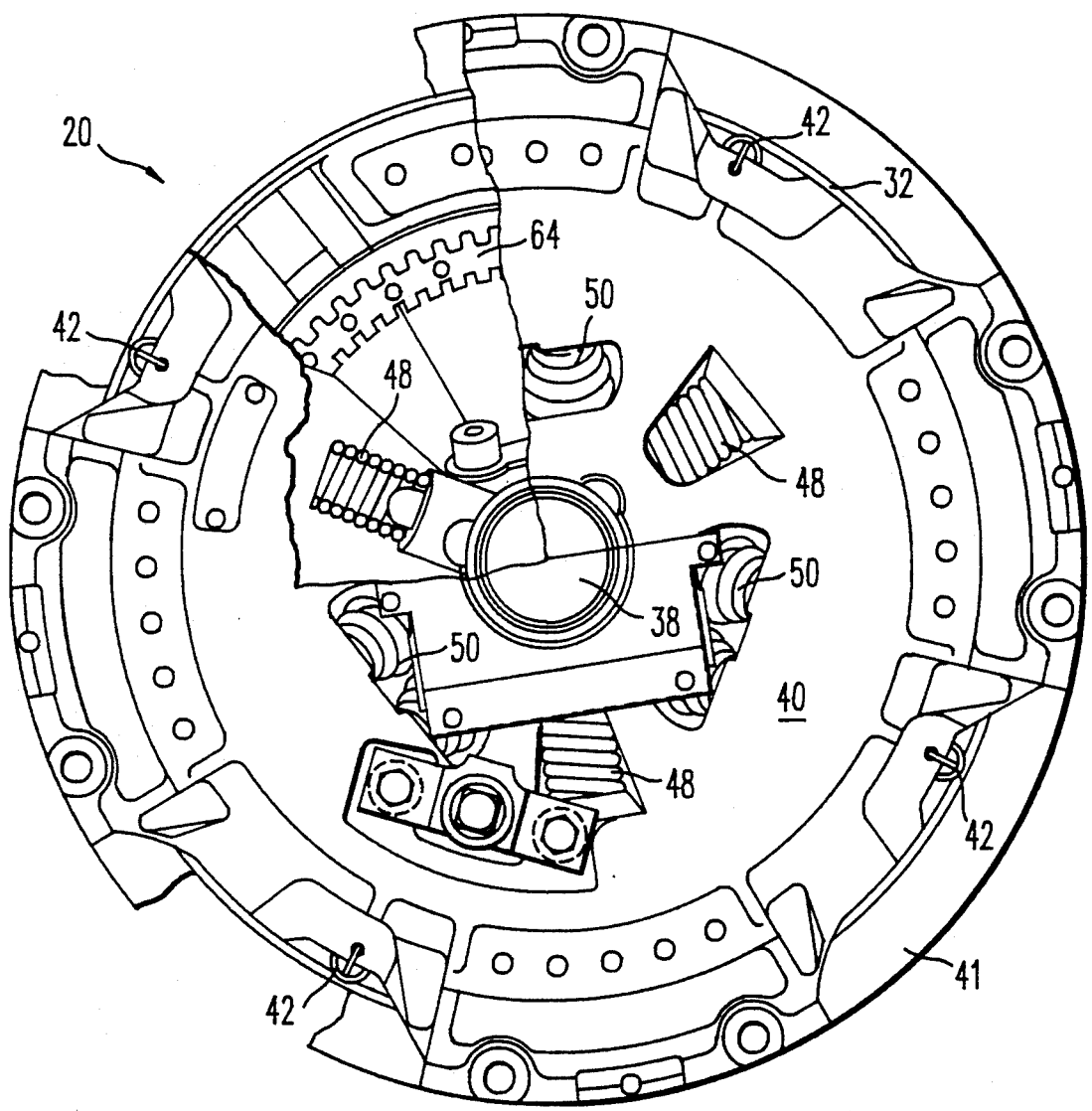
FIG. 2 is a front view of the clutch of FIG. 1 with portions cut away.

Referring now to FIGS. 1 and 2, there is shown a clutch 20, configured in accordance with the principals of the instant invention, wherein first and second driven discs 22 and 24 have friction faces 26 and 28 which are urged into abutment with an intermediate plate 30 by a pressure plate 32 while the clutch is engaged. Driven discs 22 and 24 are fixed via splined hubs 36 and 37 to an output shaft 38, which rotates about an axis 39 and is used to drive, for example, the wheels of a vehicle (not shown.) The pressure plate 32 is mounted within a clutch cover 40 which is fixed to a flywheel 41. A plurality of coil springs 42 attach the periphery of the pressure plate 32 to the clutch cover.

The clutch cover 40 is supported on a hub 46 by a plurality of radially extending coil springs 48 and a plurality of canted coil springs 50, which canted coil springs have an axial component urging the hub 46 in the direction of the pressure plate 32. A plurality of levers 52, each having a first end 54, a second end 56, and an offset abutting surface 58 are disposed radially around the hub 46. The first end 54 of each lever 52 fits in a pivot groove 58 in the hub 46 while the second end 56 of each lever has a slot 60 therein through which extends an L-shaped mounting pivot 62 projecting from an adjusting ring 64.

As will be further explained hereinafter, the adjusting ring 64 is threadably fixed to the clutch cover 40 by a threaded coupling 65 so as to rotate therewith and normally holds the offset abutment surfaces 58 on the levers 52 in engagement with an opposed abutting surface 66 on the pressure plate 32. Since the springs 50 normally apply an axially directed force component, the hub 46 and the ends 54 of the levers 52 are urged in an axial direction toward the pressure plate 32, urging the abutment surfaces 58 and 66 into engagement, so as to press the pressure plate 32 against the assembly of the discs 22 and 24 and intermediate plate 26. Moreover, the coil springs 48 normally exert a force with a slight axial component in the direction of axis 41 and are normally disposed over center to direct that component toward the pressure plate 32.

In order to disengage the clutch 20, the hub 46 is axially slid against the bias of canted springs 50 to the right of FIG. 1 in the direction of arrow 70. This causes the levers 52 to pivot about pivots 62 on the adjusting ring 64 thereby disengaging abutting surfaces 58 and 66 and causing coil springs 48 move over center to reverse the direction of their axial force component to the direction of arrow 70. This causes the pressure plate 32 to move out of abutment with the disc 24 allowing the clutch cover 20 to rotate independently of the output shaft 38 as the cover rotates with the flywheel 41.

Upon releasing the hub 46, the hub is urged by the strong springs 50 in the direction of arrow 72. This causes levers 52 to rotate in the direction of arrows 74 so as to continue to urge the pressure plate 32 against the disc 24 due to engagement of abutting surfaces 58 and 56 to recouple the rotation flywheel 41 to the output shaft 38.

As the clutch 20 operates, the friction faces 26 and 28 on the discs 22 and 24 abrade, changing the distance that pressure plate 32 must travel in order to maintain frictional engagement between the friction faces. Eventually, the pivotal movement of the levers 52 is no longer sufficient to achieve proper abutment of the friction faces 26 and 27, and the clutch 20 begins to slip. When this happens, the adjusting ring 64 can be axially relocated with respect to the clutch cover 40 by rotating the adjusting ring in the clutch cover. This is accomplished by rotating a gear 80 mounted on the clutch cover 40, which has gear teeth 82 which mesh with gear teeth 84 on the adjusting ring 64. As the adjusting ring 64 is rotated, the threaded coupling 65 shifts the adjusting ring in the direction of arrow 72 to shift the pivot 62 for the levers 52 further toward pressure plate 32.

2. Lubrication of the Threaded Coupling 65

In that the adjusting ring 64 is subjected to both repeated impact and continual vibration, it is necessary to maintain a film of lubricant in the threaded coupling 65 otherwise, the adjusting ring can possibly bind with the clutch cover 40, making adjustment very difficult, or perhaps impossible, since the adjusting ring will resist rotation within the clutch cover if the threads are damaged.

It has been found that lubricant tends to jump over the threads of the threaded coupling 65 during operation of the clutch 26, thus resulting in fretting due to mechanical working of the threaded area and corrosion due to contaminants and moisture entering the threaded coupling as the lubricant leaves. Thus, what may appear to be a relatively minor phenomenon can result in the clutch 20 being unadjustable, requiring the customer to replace discs 22 and 24, as well as the entire clutch since damage to the threaded coupling 66 of the clutch is an expensive repair to undertake.

3. Sealing of Lubricant in the Threaded Coupling 65

In accordance with the principles of the instant invention, difficulties resulting from lubricant being purged from the threaded coupling 65 are avoided by providing the clutch 20 with a sealing arrangement 100 between the adjusting ring 64 and housing 40, which precludes or at least minimizes purging of lubricant.

Figure 4:
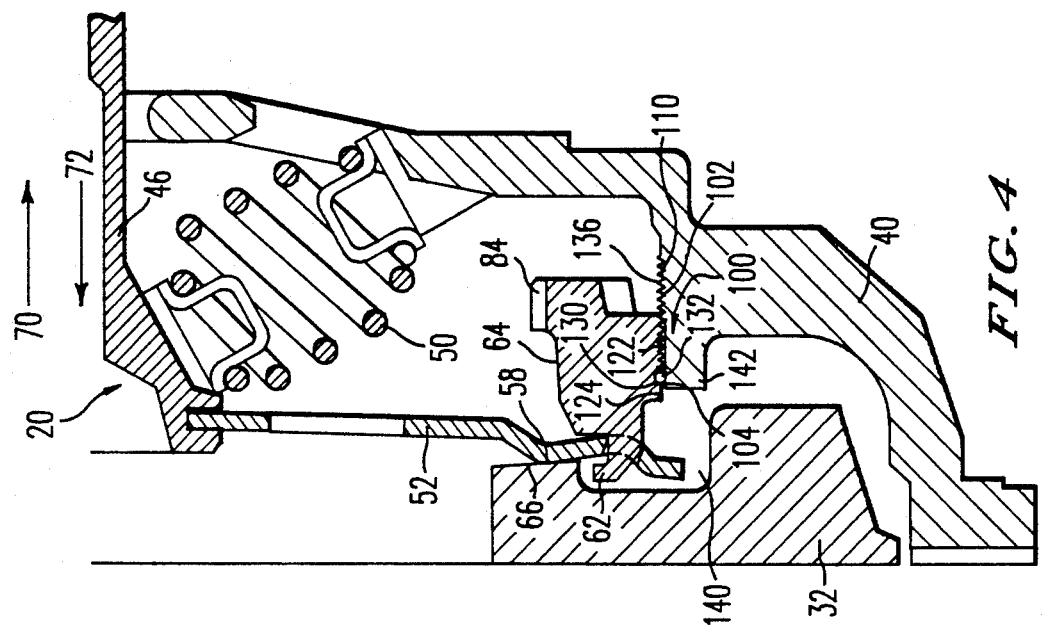
FIG. 4 is an enlarged view similar to FIG. 3 showing a position of the adjusting ring with respect to the clutch cover subsequent to adjustments compensating for clutch wear.
Figure 3:
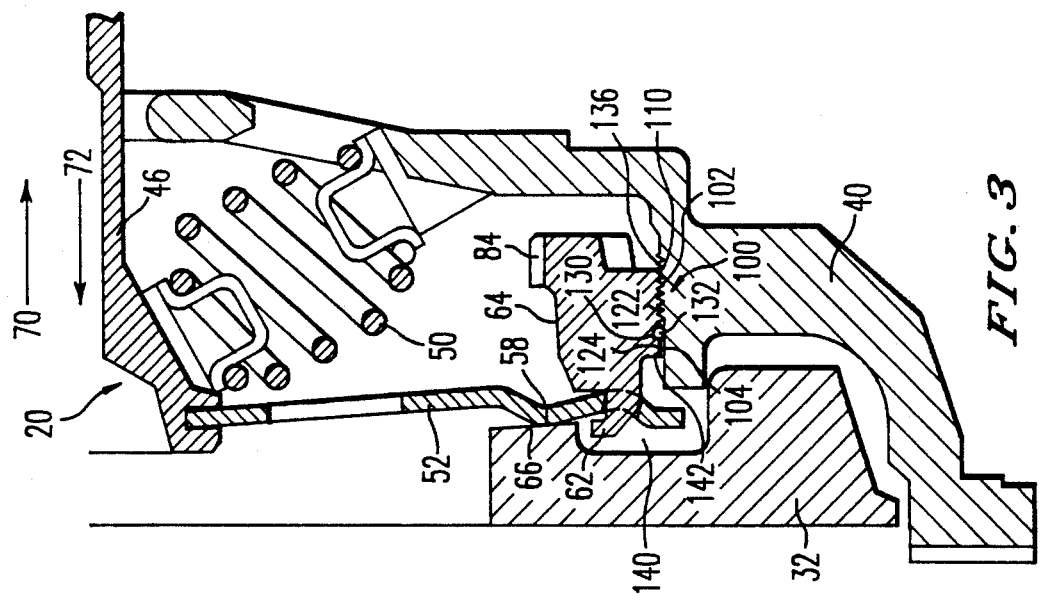
FIG. 3 is an enlarged elevational view of a portion of the clutch as shown in FIG. 1 illustrating initial, relative positions of an adjusting ring and clutch cover.

As is best seen in FIGS. 3 and 4, the sealing arrangement 100 is provided by an inner cylindrical surface on the housing 40. The inner cylindrical surface is divided into threaded portion 102 and a smooth, cylindrical portion 104 disposed outboard of the threaded portion. The smooth portion 104 has a diameter substantially equal to, or just slightly greater than, a diameter defined by the bottom of the thread 110 comprising the threaded portion 102.

Adjusting ring 64 has a cylindrical outer surface which is defined by a threaded portion 122 and an unthreaded portion 124. The smooth, unthreaded portion 124 has a diameter slightly less than the internal diameter defined by the unthreaded portion 104 of the clutch housing 40. Disposed in a groove 130 positioned just outboard of a first end of the threaded portion 122 of adjusting ring 64 is an "O" ring 132. The "O" ring 132 is elastic and slightly deformed by engagement with the smooth, cylindrical surface 104 so as to provide a seal outboard of the threaded portion 122. In a preferred embodiment, the "O" ring is made of a fluorocarbon rubber such as VITON TM rubber.

Disposed between the threads of the threaded portion 122 and the threads of the threaded portion 102 is a layer of grease with which the threaded portions are coated prior to assembly. A preferred grease is DARINA TM available from Shell Oil Company. The "O" ring 132 minimizes or substantially eliminates purging of the layer of grease by forming a barrier to the migration of grease in the direction of arrow 72. No seal is provided proximate opposite end 136 of the threaded portion 122 because the airtight engagement of seal 132 with the smooth surface 104 tends to provide resistance to migration of the grease in the direction of arrow 70 due to positive atmospheric pressure at the second end 136 of the threads. In addition, there is an extremely long path through which the grease must migrate in order to cause depletion out the second end 136 of the threads and any tendency to migrate in that direction is opposed by the tendency to create a vacuum in the layer of grease between the threaded portions 102 and 122.

Since the grease is maintained between the threaded portions 102 and 122, contaminants and moisture are unable to invade the threaded coupling without displacing the grease. Since "O" ring 132 is in sealing engagement with smooth surface 104, displacement of the grease is essentially precluded over the useful life of the clutch 20, which is in essence the useful life of the vehicle or other device with which the clutch is used.

As the friction faces 26 and 28 on the discs 22 and 24 (FIG. 1) wear, the adjusting ring 64 can be rotated in the clutch cover 20 by a mechanic to advance the adjusting ring toward the position shown in FIG. 4. As is seen in FIG. 4, the adjusting ring 64 is moved in the direction of arrow 72 in order to move the second end 56 of lever 52 closer to the pressure plate 32 so that the abutment surfaces 58 and 66 engage with sufficient force. The "O" ring 132 maintains sealing engagement with the surface 104 as the adjusting ring 64 is moved axially so as to provide a sealing barrier between the environment on the pressure plate side of the adjusting ring 64, which sealing barrier also discourages migration of grease from the opposite end 136 of the threaded portion 122. Since the diameter of the smooth, cylindrical surface 104 is slightly greater than the diameter of the bottom 108 of the threads 110, the adjusting ring 64 readily advances in axial direction 72 while the seal between "O" ring 132 and surface 104 remains.

Since the pressure plate 32 has an annular depression 140 formed therein to provide space for accommodating pivot 62, the clutch cover 40 provides space for the smooth, cylindrical surface 104 on an annular lip 142 which projects into the annular depression. Consequently, the overall dimensions of the clutch cover 40 need not be changed to accommodate the sealing arrangement 100. The axial length of the smooth, cylindrical surface 104 provided by the annular lip 142 is sufficient to accommodate a number of adjustments of the adjusting ring 64 before the friction surfaces 26 and 28 of the discs 22 and 24 degrade to the point where they are no longer effective.

The sealing arrangement provided by sealing arrangement 100 of the instant invention requires a relatively minor alteration in the structure of a clutch cover 40 and adjusting ring 64 since all that is required is to provide a smooth, cylindrical surface 104 on the housing 40, a groove 130 in the adjusting ring 64 and an "O" ring 132 seating in the groove and engaging the smooth, cylindrical surface. This relatively inexpensive alteration results in substantial increase in clutch life by minimizing the likelihood that the adjusting ring 64 will bind to the clutch cover 40 during the life of the clutch 20.

An additional advantage provided by the "O"-ring 132 is that the "O"-ring takes up the slack created by the threads of threaded portions 102 and 122 having small spaces therebetween. Since the "O" ring 132 is of elastic material, it damps out vibrations in the clutch 20 while taking up the slack resulting in a smoother running clutch.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A sealing arrangement for a friction clutch with an adjusting ring threadably secured to a clutch cover integral with a flywheel wherein the adjusting ring provides support for a plurality of levers which are normally urged into an abutment with a pressure plate to couple the clutch cover to an output shaft by frictionally engaging clutch discs driving the output shaft, the arrangement comprising:
    an internal cylindrical surface on the clutch cover, the internal cylindrical surface having a first threaded portion with first and second ends and an unthreaded portion with the unthreaded portion being disposed between the threaded portion and the pressure plate which is spaced from the clutch cover;
    an external cylindrical surface on the adjusting ring, the external cylindrical surface having a second threaded portion with first and second ends and a groove, the groove being disposed between the second threaded portion and the pressure plate and the second threaded portion being threaded to the first threaded portion of the clutch cover;
    a layer of grease disposed between the first and second threaded portions; and
    a seal positioned in the groove of the adjusting ring proximate the first ends of the threaded portions and remote from the second ends of the threaded portions, the seal being in sealing engagement with the unthreaded portion of the clutch cover and the second ends of the threaded portions being open to the atmosphere whereby air pressure tends to keep the grease between abutting sections of the thread portions due to the proximity of the seal with the first ends, whereby the grease is retained between the first and second threaded portions.

2. The sealing arrangement of claim 1 wherein the seal is an "O" ring and wherein unthreaded portion is a smooth cylindrical surface.

3. The sealing arrangement of claim 2 wherein the "O" ring is made of fluorocarbon rubber.

4. A friction clutch for coupling a rotating flywheel with an output shaft, the clutch comprising:
    a clutch cover rotatable with the flywheel, the clutch cover including an internal, threaded surface with a first threaded portion having first and second ends and a smooth unthreaded portion;
    an adjusting ring with a second threaded portion with first and second ends, the adjusting ring being threadably engaged with the first threaded portion of the clutch cover and having a groove disposed proximate the smooth unthreaded portion, the adjusting ring having lever support means extending in the direction of the axis;
    a layer of grease disposed between the first and second threaded portions;
    a seal disposed in the groove of the adjusting ring proximate the first ends of the threaded portions and remote from the second ends of the threaded portions, the seal being in sealing engagement with the smooth, unthreaded portion of the internal cylindrical surface of the clutch cover and the second ends of the threaded portions being open to the atmosphere whereby air pressure tends to keep the grease between abutting sections of the thread portions due to the proximity of the seal with the first ends;

a pressure plate disposed proximate the lever support means of the adjusting ring;

a sleeve slidably mounted on the output shaft, the sleeve having a lever support means thereon;

a plurality of levers having first and second ends, the first ends being supported on the lever support of the sleeve and the second ends being supported on the lever support means of the adjusting ring;

resilient means for urging the sleeve toward the pressure plate to urge the levers into abutment with the pressure plate so as to normally engage the clutch; and friction disc means in proximity with the pressure plate and fixed to the output shaft, the friction disc means being normally engaged by the pressure plate to drive the output shaft as the clutch cover rotates with the flywheel; the friction disc means abrading over time as the clutch is engaged and disengaged, the adjusting ring being rotated to advance toward the pressure plate to compensate for abrasion of the disc means, and the seal minimizing purging of the grease from between the adjusting ring and cover plate, whereby the adjusting ring remains rotatable with respect to the cover plate over time.

5. The friction clutch of claim 4, wherein the lever support means on the adjusting ring are pivots, wherein the pressure plate includes an annular indentation into which the pivots of the adjusting ring project, and wherein the clutch cover includes an annular projecting lip which is aligned with the annular groove of the pressure plate; the smooth, cylindrical portion including an inner, circular portion of the annular lip.

6. The clutch of claim 4, wherein a seal is an "O" ring.

7. The sealing arrangement of claim 6, wherein the "O" ring is made of fluorocarbon rubber.

* * * * *